(12) United States Patent
Ye et al.

(10) Patent No.: US 10,991,132 B2
(45) Date of Patent: Apr. 27, 2021

(54) METHOD FOR PROCESSING SPARSE-VIEW COMPUTED TOMOGRAPHY IMAGE USING NEURAL NETWORK AND APPARATUS THEREFOR

(71) Applicant: Korea Advanced Institute of Science and Technology, Daejeon (KR)

(72) Inventors: JongChul Ye, Daejeon (KR); Yoseob Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 56 days.

(21) Appl. No.: 16/365,498

(22) Filed: Mar. 26, 2019

(65) Prior Publication Data

US 2019/0371018 A1    Dec. 5, 2019

(30) Foreign Application Priority Data

May 29, 2018  (KR) ........................ 10-2018-0060849

(51) Int. Cl.
*G06K 9/00*  (2006.01)
*G06T 11/00*  (2006.01)
*G06N 3/08*  (2006.01)

(52) U.S. Cl.
CPC .............. *G06T 11/006* (2013.01); *G06N 3/08* (2013.01); *G06T 11/008* (2013.01)

(58) Field of Classification Search
CPC .... G06T 11/006; G06T 11/008; G06T 11/003; G06T 7/0012; G06T 7/0081; G06T 7/0083; G06T 2207/10081; G06N 3/08; G06K 9/66; G06K 9/4628; G06K 9/32; G06K 9/2013; G06K 9/344; A61B 6/0306
See application file for complete search history.

(56) References Cited

U.S. PATENT DOCUMENTS

| | | | |
|---|---|---|---|
| 9,508,164 B2 * | 11/2016 | Cierniak | G06T 11/006 |
| 9,816,948 B2 * | 11/2017 | Haidekker | G01N 33/025 |
| 10,475,214 B2 * | 11/2019 | Fu | G06T 11/003 |
| 10,489,939 B2 * | 11/2019 | Xing | G06T 11/005 |
| 10,628,973 B2 * | 4/2020 | De Man | G06T 11/006 |
| 10,685,429 B2 * | 6/2020 | Mentl | G06T 11/008 |
| 10,733,745 B2 * | 8/2020 | Pizer | G06T 7/20 |
| 2019/0216409 A1 * | 7/2019 | Zhou | A61B 6/032 |
| 2019/0371018 A1 * | 12/2019 | Ye | G06T 11/008 |
| 2019/0384963 A1 * | 12/2019 | Kim | G06K 9/6267 |

OTHER PUBLICATIONS

Han et al., "Framing U-Net via Deep Convulutional Framelets: Application to Sparse-view CT," EEEE, Mar. 28, 2018.
Office Action issued in Korean Patent Application No. 10-2018-0060849 dated Aug. 12, 2019.

(Continued)

*Primary Examiner* — Amir Alavi
(74) *Attorney, Agent, or Firm* — Marshall, Gerstein & Borun LLP

(57) ABSTRACT

A method for processing a sparse-view computed tomography (CT) image using a neural network and an apparatus therefor are provided. The method includes receiving a sparse-view CT data and reconstructing an image for the sparse-view CT data using a neural network of a learning model satisfying a predetermined frame condition.

9 Claims, 9 Drawing Sheets

(a)

(b)

(56) References Cited

OTHER PUBLICATIONS

Zhang et al., "A Sparse-View CT Reconstruction Method Based on Combination of DenseNet and Deconvolution," *IEEEE Transactions on Medical Imagine*, vol. 37 (Jun. 2018).
Ye et al., "Deep Convolutional Framelets: A General Deep Learning Framework for Inverse Problems," *SIAM Journal on Imaging Sciences*, vol. 11, Issue 2 (2017).
Han et al., "Deep Residual Learning for Compressed Sensing CT Reconstruction via Persistent Homology Analysis," (Nov. 2016).

\* cited by examiner

⇨ Conv   ☐ Receptive field (a)

⇨ Pooling   ⇨ Unpooling   ☐ Receptive field (b)

METHOD FOR PROCESSING SPARSE-VIEW COMPUTED TOMOGRAPHY IMAGE USING NEURAL NETWORK AND APPARATUS THEREFOR

CROSS-REFERENCE TO RELATED APPLICATIONS

This work was supported by Institute of Information & Communications Technology Planning & Evaluation (IITP) grant funded by the Korea government (MSIT) [2016-0-00562(R0124-16-0002), Emotional Intelligence Technology to Infer Human Emotion and Carry on Dialogue Accordingly]. This application claims priority under 35 U.S.C. § 119 to Korean Patent Application No. 10-2018-0060849 filed on May 29, 2018, in the Korean Intellectual Property Office, the disclosures of which are incorporated by reference herein in their entireties.

BACKGROUND

Embodiments of the inventive concept described herein relate to a method for processing images using a neural network and an apparatus therefor, and more particularly, relate to a method for reconstructing a sparse-view computed tomography (CT) image as a high-quality image using a neural network for a learning model satisfying a predetermined condition and an apparatus therefor.

CT which is an imaging technique for obtaining CT images of objects obtains X-rays attenuated after transmitting X-rays to objects and reconstructs CT images using the obtained X-rays. Because the CT uses X-rays, the exposure of radiation is emerging as a major issue. Various researches have been conducted to solve the above problems. There is low-dose CT for reducing the intensity of X-rays, interior tomography for irradiating X-rays to only local areas to generate CT images, or the like. Furthermore, there is sparse-view CT for reducing the number of photographed X-rays as the method for reducing the X-ray dose.

The sparse-view CT is a method that lowers the radiation dose by reducing the number of projection views. While the sparse view CT may not be useful for existing multi-detector CT (MDCT) due to the fast and continuous acquisition of projection views, there are many new applications of sparse-view CT such as spectral CT using alternating kVp switching, dynamic beam blocker, and the like. Moreover, in C-arm CT or dental CT applications, the scan time is limited primarily by the relative slow speed of the plat-panel detector, rather than the mechanical gantry speed, so sparse-view CT gives an opportunity to reduce the scan time.

However, insufficient projection views in sparse-view CT produces severe streaking artifacts in filtered-backprojection (FBP) reconstruction. To address this, conventional technologies have investigated compressed sensing approaches that minimize the total variation (TV) or other sparsity-inducing penalties under a data fidelity term. These approaches are, however, computationally expensive due to the repeated applications of projection and back-projection during iterative update steps.

Recently, deep learning approaches have achieved tremendous success in various fields, such as classification, segmentation, denoising, super resolution. In CT applications, the previous approach provided the systematic study of deep convolutional neural network (CNN) for low-dose CT and showed that a deep CNN using directional wavelets is more efficient in removing low-dose related CT noises. This work was followed by many novel extensions for low-dose CT. Unlike these low-dose artifacts from reduced tube currents, the streaking artifacts originated from sparse projection views show globalized artifacts that are difficult to remove using conventional denoising CNNs. To address this problem, previous technologies proposed residual learning networks using U-Net. Because the streaking artifacts are globally distributed, CNN architecture with large receptive field was shown essential in these works, and their performance was significantly better than the existing approaches.

SUMMARY

Embodiments of the inventive concept provide a method for reconstructing a sparse-view CT image as a high-quality image using a neural network for a learning model satisfying a predetermined frame condition and an apparatus therefor.

According to an exemplary embodiment, an image processing method may include receiving a sparse-view computed tomography (CT) data and reconstructing an image for the sparse-view CT data using a neural network of a learning model satisfying a predetermined frame condition.

The reconstructing of the image may include reconstructing the image for the sparse-view CT data using the neural network of the learning model which satisfies the frame condition and is learned by residual learning.

The neural network may include a neural network which generates the learning model satisfying the frame condition through a mathematical analysis based on convolutional framelets and is learned by the learning model.

The neural network may include a multi-resolution neural network including pooling and unpooling layers.

The neural network may include a structured tight frame neural network by decomposing a structured dual frame neural network and the multi-resolution neural network into a low-frequency domain and a high-frequency domain using wavelets by expressing a mathematical expression of the multi-resolution neural network as a dual frame.

The neural network may include a by-pass connection from the pooling layer to the unpooling layer.

According to an exemplary embodiment, an image processing method may include receiving a sparse-view CT data and reconstructing an image for the sparse-view CT data using a neural network for a learning model which satisfies a predetermined frame condition and is based on convolutional framelets.

The neural network may include a multi-resolution neural network including pooling and unpooling layers.

The neural network may include a structured tight frame neural network by decomposing a structured dual frame neural network and the multi-resolution neural network into a low-frequency domain and a high-frequency domain using wavelets by expressing a mathematical expression of the multi-resolution neural network as a dual frame.

According to an exemplary embodiment, an image processing device may include a reception unit configured to receive a sparse-view CT data and a reconstruction unit configured to reconstruct an image for the sparse-view CT data using a neural network of a learning model satisfying a predetermined frame condition.

The reconstruction unit may be configured to reconstruct the image for the sparse-view CT data using the neural network of the learning model which satisfies the frame condition and is learned by residual learning.

The neural network may include a neural network which generates the learning model satisfying the frame condition through a mathematical analysis based on convolutional framelets and is learned by the learning model.

The neural network may include a multi-resolution neural network including pooling and unpooling layers.

The neural network may include a structured tight frame neural network by decomposing a structured dual frame neural network and the multi-resolution neural network into a low-frequency domain and a high-frequency domain using wavelets by expressing a mathematical expression of the multi-resolution neural network as a dual frame.

The neural network may include a by-pass connection from the pooling layer to the unpooling layer.

BRIEF DESCRIPTION OF THE FIGURES

The above and other objects and features will become apparent from the following description with reference to the following figures, wherein like reference numerals refer to like parts throughout the various figures unless otherwise specified, and wherein:

(a) and (b) of FIG. 1 are drawings illustrating an example of CT streaking artifact patterns in the reconstruction images from 48 projection views;

Figure 2:
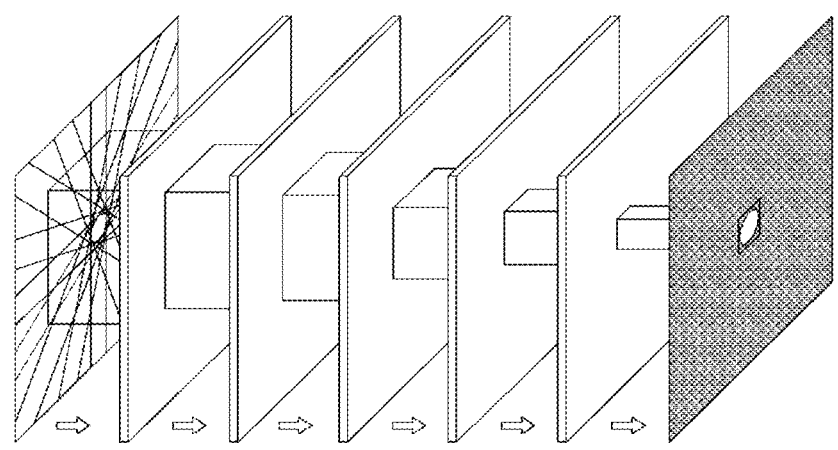
Figure 2:
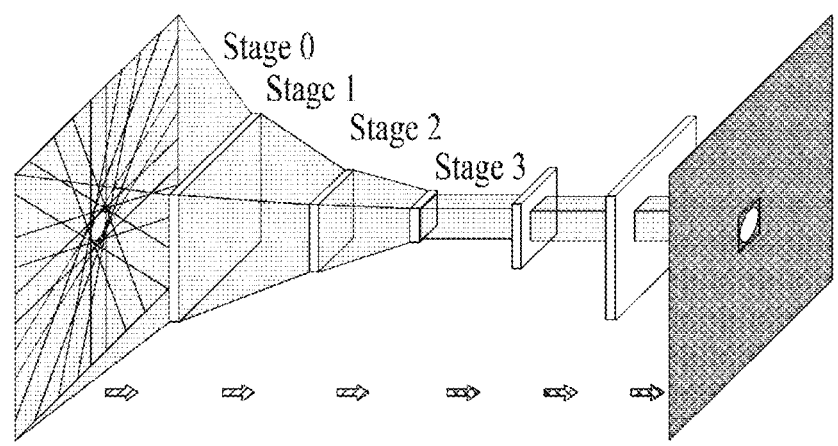
Figure 3:
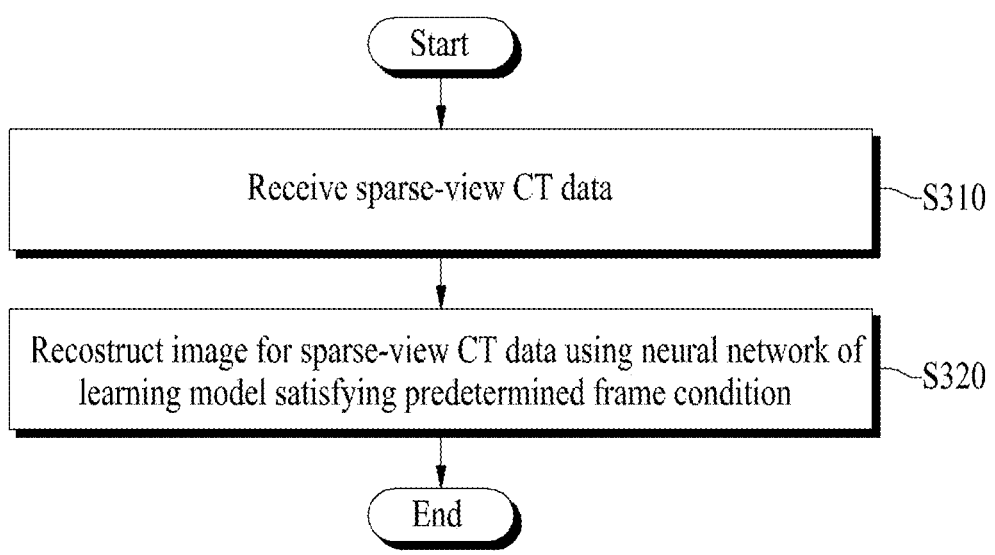
Figure 4:
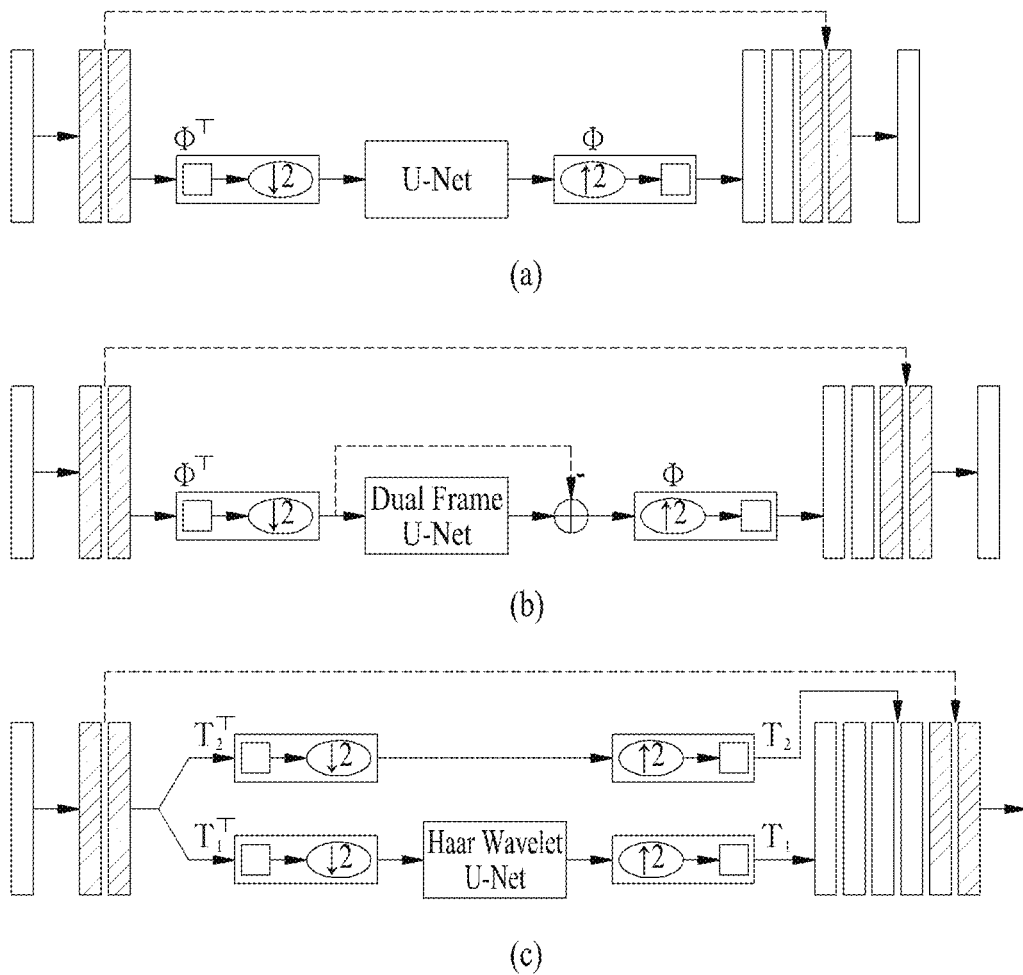
Figure 5A:
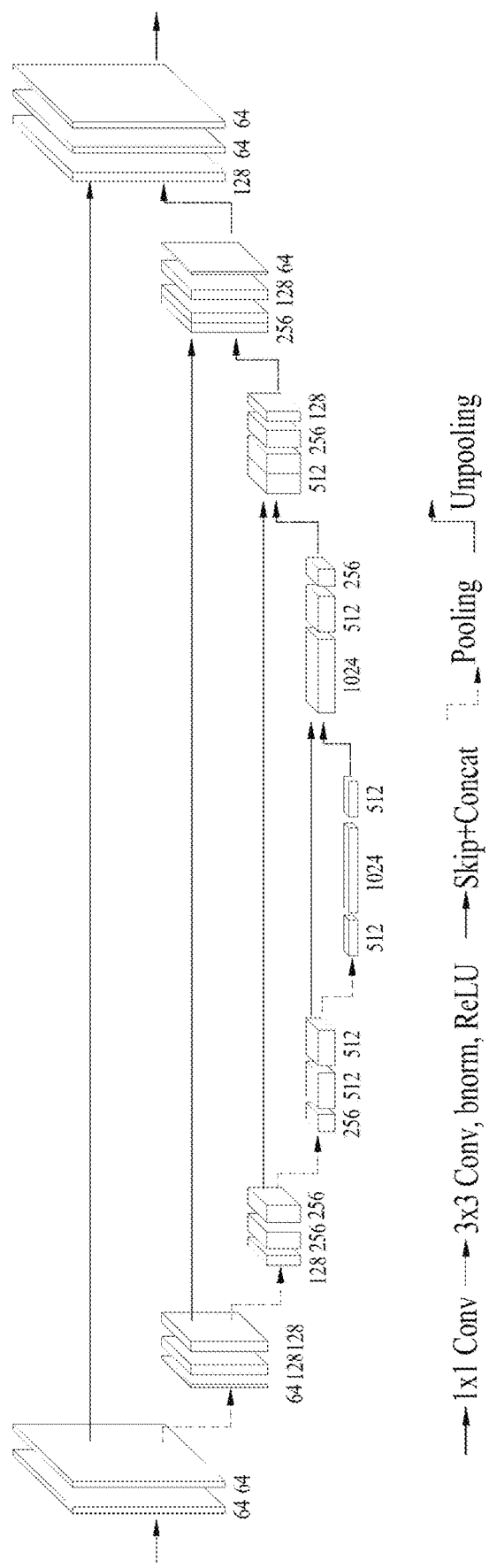
Figure 5B:
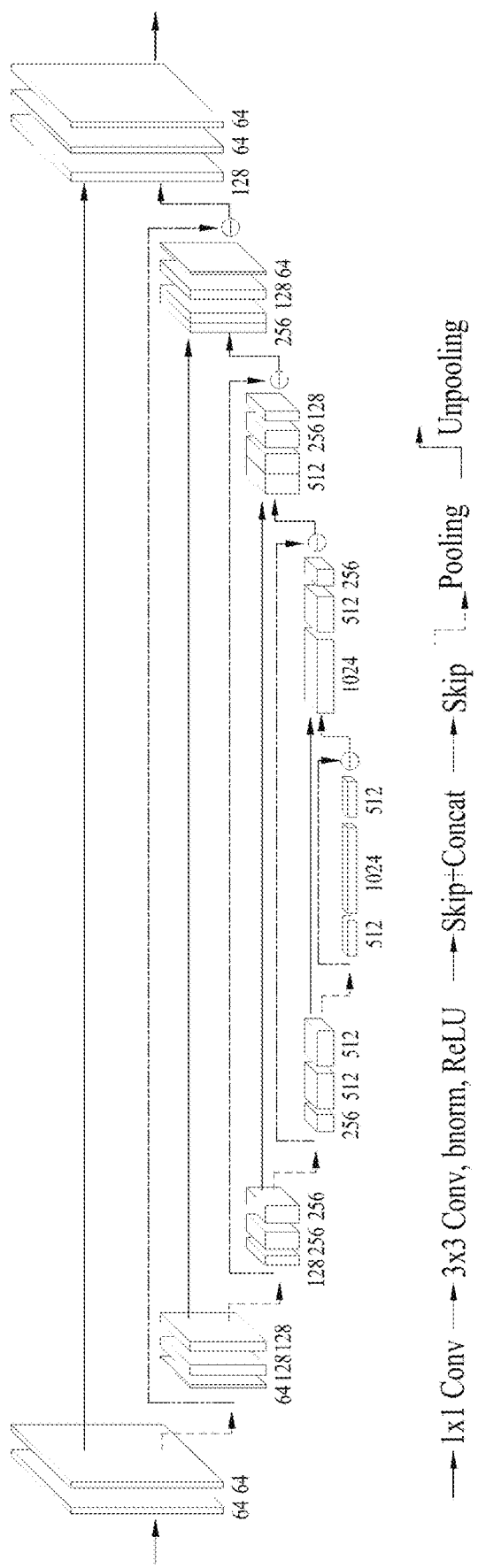
Figure 5C:
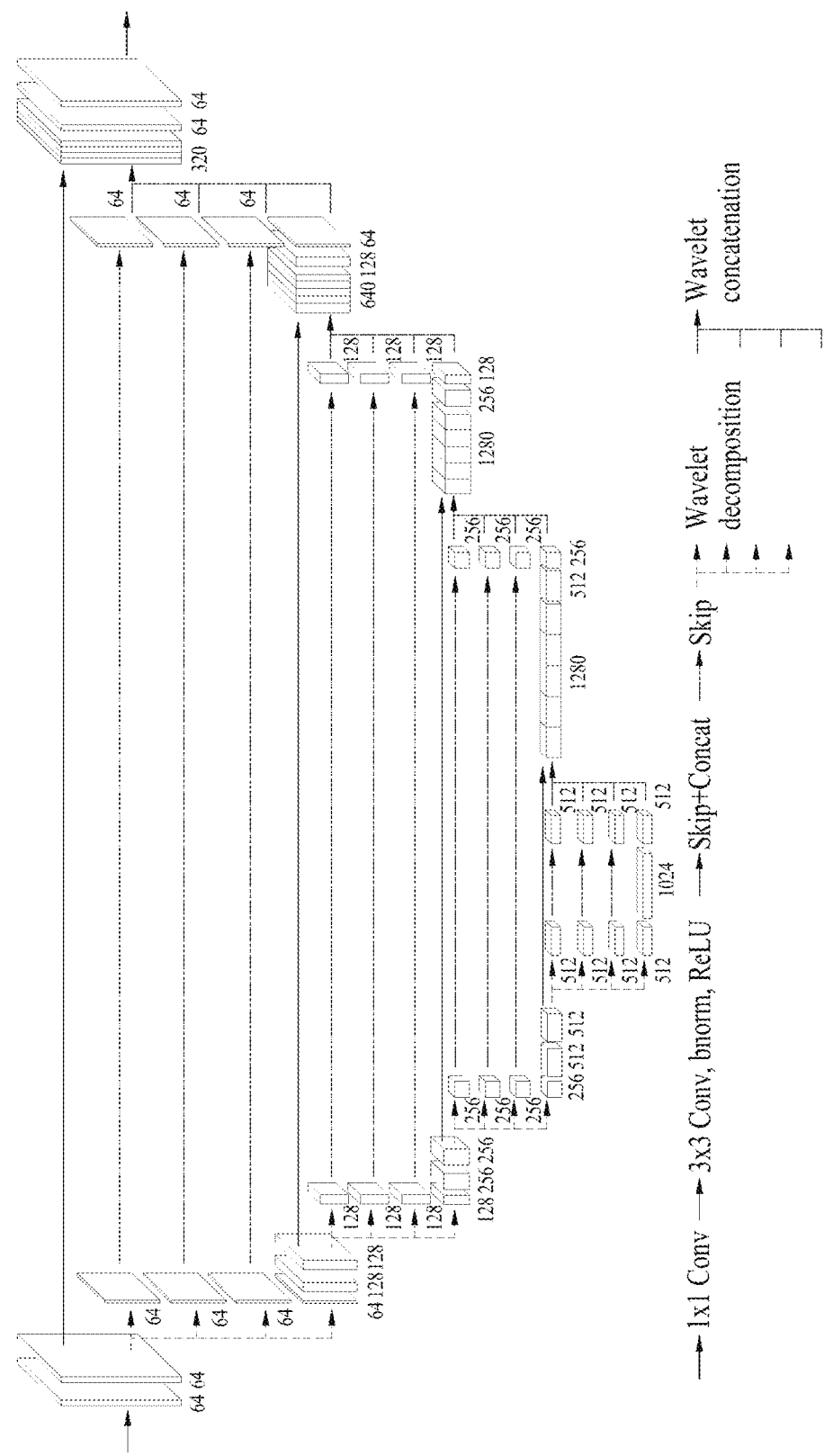
Figure 6:
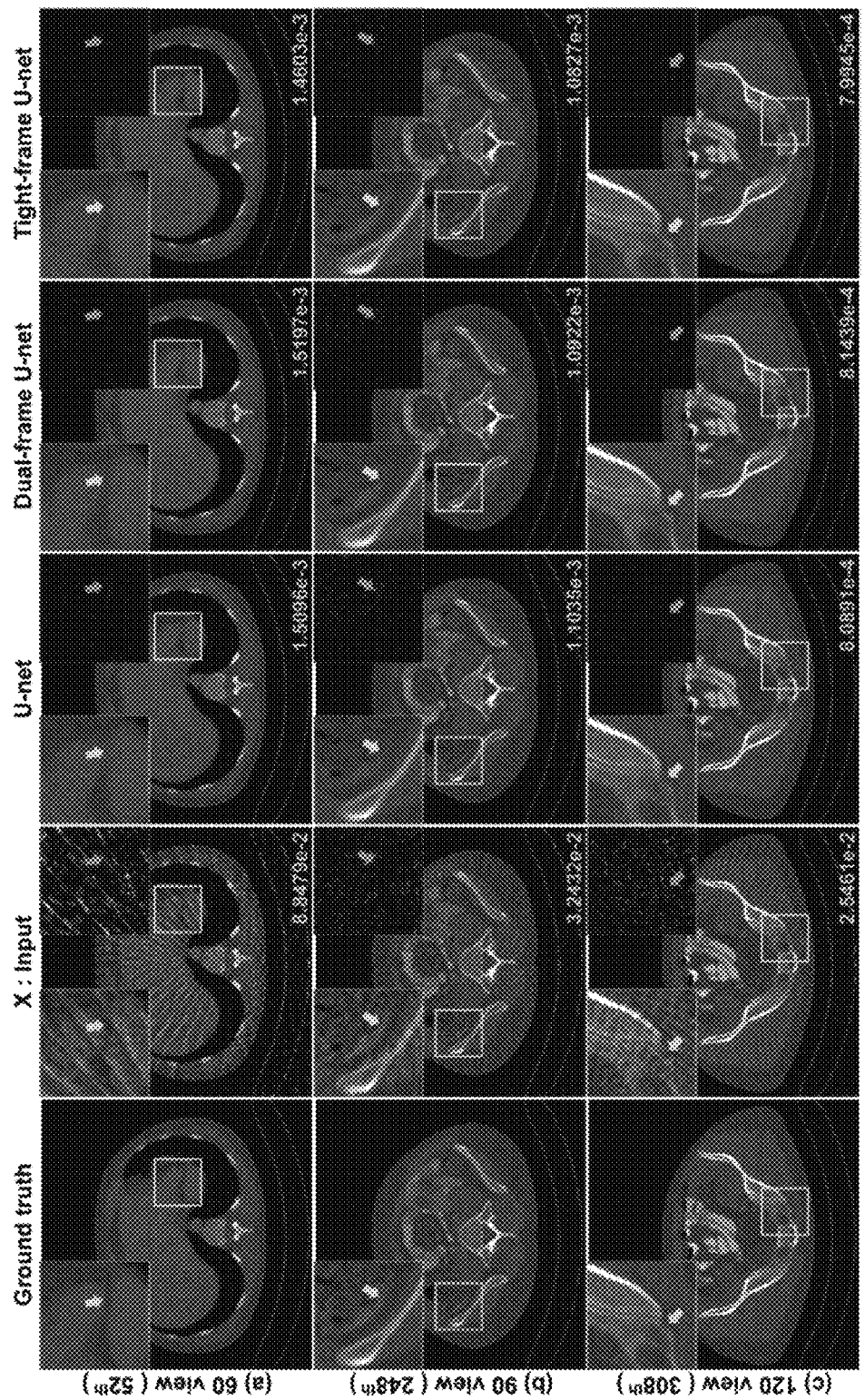
Figure 7:
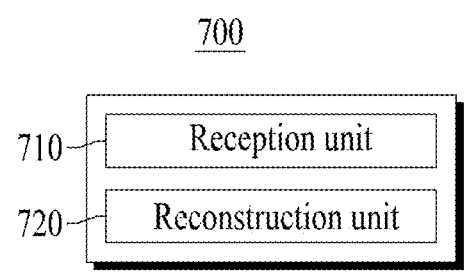

(a) and (b) of FIG. 2 are drawings illustrating an example of comparing sizes of receptive fields according to a structure of a network or a neural network;

FIG. 3 is an operational flowchart illustrating an image processing method according to an embodiment of the inventive concept;

(a), (b), and (c) of FIG. 4 are drawings illustrating a simplified U-Net architecture, a dual frame U-Net architecture, and a tight frame U-Net architecture;

FIGS. 5A, 5B, and 5C are drawings illustrating a standard U-Net architecture, a dual frame U-Net architecture, and a tight frame U-Net architecture;

(a), (b), and (c) of FIG. 6 are drawings illustrating an example of reconstruction results by general, dual frame, and tight frame U-Nets at various sparse view reconstruction; and FIG. 7 is a block diagram illustrating a configuration of an image processing device according to an embodiment of the inventive concept.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

The convolutional framelet may be represented for the input signal f using the local basis $\psi_j$ and the non-local basis $\phi_i$ and may be represented as Equation 1 below.

$$f = \frac{1}{d}\sum_{i=1}^{n}\sum_{j=1}^{q} \langle f, \phi_i \circledast \psi_j \rangle \tilde{\phi}_i \circledast \tilde{\psi}_j \quad \text{[Equation 1]}$$

Herein, $\phi_i$ denotes the linear transform operator with the non-local basis vector, and $\psi_j$ denotes the linear transform operator with the local basis vector.

In this case, the local basis vector and the non-local basis vector may have the dual basis vectors $\tilde{\phi}_i$ and $\tilde{\psi}_j$, respectively, which are orthogonal to each other. The orthogonal relationship between the basis vectors may be defined as Equation 2 below.

$$\tilde{\Phi}\Phi^\top = \sum_{i=1}^{m} \tilde{\phi}_i \phi_i^\top = I_{n \times n},$$

$$\Psi\tilde{\Psi}^\top = \sum_{j=1}^{q} \psi_j \tilde{\psi}_j^\top = I_{d \times d} \quad \text{[Equation 2]}$$

Using Equation 2 above, the convolutional framelet may be represented as Equation 3 below.

$$\mathbb{H}_d(f) = \tilde{\Phi}\Phi^\top \mathbb{H}_d(d)\Psi\tilde{\Psi}^\top = \tilde{\Phi}C\tilde{\Psi}^\top$$

$$C = \Phi^\top \mathbb{H}_d(f)\Psi = \Phi^\top(f \circledast \Psi) \quad \text{[Equation 3]}$$

Herein, $\mathbb{H}_d$ denotes the Hankel matrix operator, which may allow the convolutional operation to be represented as the matrix multiplication, and C denotes the convolutional framelet coefficient which is the signal transformed by the local basis and the non-local basis.

The convolutional framelet coefficient C may be reconstructed as the original signal by applying the dual basis vectors $\tilde{\phi}_i$, $\tilde{\psi}_j$. The reconstruction process may be represented as Equation 4 below.

$$f = (\tilde{\Phi}c) \circledast \tau(\tilde{\Psi}) \quad \text{[Equation 4]}$$

As such, the technique of representing the input signal through the local basis and the non-local basis may be the convolutional framelet.

One of the key ingredients for the deep convolutional framelets may be the frame condition for the non-local basis. However, the existing neural network architecture, for example, the U-Net architecture, does not satisfy the frame condition and it overly emphasizes the low frequency component of the signal. In sparse-view CT, this artifact may be manifested as blurring artifacts in the reconstructed images.

An embodiment of the inventive concept may provide two types of novel network architectures that satisfy the frame condition and may provide a dual frame network and a tight frame network.

Herein, the dual frame network may be a by-pass connection in the low-resolution path to generate a residual signal. The tight frame network with orthogonal wavelet basis, for example, Haar wavelet basis may be implemented by adding the high frequency path to the existing U-Net structure.

Mathematical Preliminaries

Notations

For a matrix A, R(A) denotes the range space of A, and $P_{R(A)}$ denotes the projection to the range space of A. The identity matrix is referred to as I. For a given matrix A, the notation $A^t$ refers to the generalized inverse matrix. The superscript T of $A^T$ denotes the Hermitian transpose. When a matrix $\Psi \in \mathbb{R}^{pd \times q}$ is partitioned as $\Psi = [\Psi_1^T \ldots \Psi_p^T]^T$ with a submatrix $\Psi_i \in \mathbb{R}^{d \times q}$, then $\psi_j^i$ refers to the j-th column of $\Psi_i$. A vector $\overline{\upsilon} \in \mathbb{R}^n$ refers to the flipped version of a vector $\upsilon \in \mathbb{R}^n$, i.e. its indices are reversed. Similarly, for a given matrix $\Psi \in \mathbb{R}^{d \times q}$, the notation $\overline{\Psi} \in \mathbb{R}^{d \times q}$ refers to flipped vectors, i.e., $\overline{\Psi} = [\overline{\psi}_1 \ldots \overline{\psi}_q]$. For a block structured matrix $\Psi \in \mathbb{R}^{pd \times q}$, with a slight abuse of notation, an embodiment of the inventive concept may define $\overline{\Psi}$ as Equation 5 below.

$$\overline{\Psi} = \begin{bmatrix} \overline{\Psi}_1 \\ \vdots \\ \overline{\Psi}_p \end{bmatrix}, \text{ where } \overline{\Psi}_i = [\overline{\psi_1^i} \ldots \overline{\psi_q^i}] \in \mathbb{R}^{d \times q}$$ [Equation 5]

Frame

A family of functions $\{\phi_k\}_{k \in \Gamma}$ in a Hilbert space H is called a frame when it satisfies the following inequality of Equation 6 below.

$$\alpha \|f\|^2 \leq \sum_{k \in \Gamma} |\langle f, \phi_k \rangle|^2 \leq \beta \|f\|^2, \forall f \in H$$ [Equation 6]

Here, $\alpha, \beta > 0$ are called the frame bounds. When $\alpha = \beta$, then the frame is said to be tight.

A frame is associated with a frame operator $\Phi$ composed of $\phi_k$: $\Phi = [\ldots \phi^{k-1} \phi_k \ldots]$. Then, Equation 6 above may be equivalently written by Equation 7 below.

$$\alpha \|f\|^2 \leq \Phi^T f\|^2 \leq \beta \|f\|^2, \forall f \in H$$ [Equation 7]

The frame bounds may be represented by Equation 8 below.

$$\alpha = \sigma_{min}(\Phi\Phi^T), \beta = \sigma_{max}(\Phi\Phi^T)$$ [Equation 8]

Here, $\sigma_{min}(A)$ and $\sigma_{max}(A)$ denote the minimum and maximum singular values of A, respectively.

When the frame lower bound $\alpha$ is non-zero, because $\hat{f} = \tilde{\Phi}c = \tilde{\Phi}\Phi^T f = f$, then the recovery of the original signal may be done from the frame coefficient $c = \Phi^T f$ using the dual frame $\tilde{\Phi}$ satisfying the frame condition represented in Equation 9 below.

$$\tilde{\Phi}\Phi^T = I$$ [Equation 9]

The explicit form of the dual frame may be given by the pseudo-inverse as Equation 10 below.

$$\tilde{\Phi} = (\Phi\Phi^T)^{-1}\Phi$$ [Equation 10]

If the frame coefficients are contaminated by the noise w, i.e., $c = \Phi^T f + w$, then the recovered signal using the dual frame is given by $\hat{f} = \tilde{\Phi}c = \tilde{\Phi}(\Phi^T f + w) = f + \tilde{\Phi}w$. Therefore, the noise amplification factor may be computed by Equation 11 below.

$$\frac{\|\tilde{\Phi}w\|^2}{\|w\|^2} = \frac{\sigma_{max}(\Phi\Phi^T)}{\sigma_{min}(\Phi\Phi^T)} = \frac{\beta}{\alpha} = \kappa(\Phi\Phi^T)$$ [Equation 11]

Here, $\kappa(\cdot)$ refers to the condition number.

A tight frame has the minimum noise amplification factor $\beta/\alpha = 1$, and it is equivalent to the condition as Equation 12 below.

$$\Phi^T \Phi = cI, c > 0$$ [Equation 12]

Hankel Matrix

Since the Hankel matrix is an essential component in the theory (K. Zhang, W. Zuo, Y. Chen, D. Meng, and L. Zhang, "Beyond a Gaussian denoiser: Residual learning of deep CNN for image denoising," arXiv preprint arXiv: 1608.03981, 2016) of deep convolutional framelets, an embodiment of the inventive concept briefly reviews it.

To avoid special treatment of boundary condition, an embodiment of the inventive concept may be mainly derived using the circular convolution. For simplicity, an embodiment of the inventive concept may consider 1-D signal processing, but the extension to 2-D signal processing may be straightforward.

Let $f = [f[1], \ldots, f[n]]^T \in \mathbb{R}^n$ be the signal vector, a wrap-around Hankel matrix $\mathbb{H}_d(f)$ may be defined by Equation 13 below.

$$\mathbb{H}_d(f) = \begin{bmatrix} f[1] & f[2] & \ldots & f[d] \\ f[2] & f[3] & \ldots & f[d+1] \\ \vdots & \vdots & \ddots & \vdots \\ f[n] & f[1] & \ldots & f[d-1] \end{bmatrix}$$ [Equation 13]

Here, d denotes the matrix pencil parameter.

When a multi-channel signal is given as Equation 14 below, an extended Hankel matrix may be constructed by stacking Hankel matrices. The extended Hankel matrix may be represented as Equation 15 below.

$$F := [f_1 \ldots f_p] \in \mathbb{R}^{n \times p}$$ [Equation 14]

$$\mathbb{H}_{d|p}(F) := [\mathbb{H}_d(f_1) \mathbb{H}_d(f_2) \ldots \mathbb{H}_d(f_p)]$$ [Equation 15]

Here, the Hankel matrix is closely related to the convolution operations in CNN. Specifically, for a given convolutional filter $\overline{\psi} = [\psi[d], \ldots, \psi[1]]^T \in \mathbb{R}^d$, a single-input single-output (SISO) convolution in CNN may be represented as Equation 16 below using a Hankel matrix.

$$y = f \circledast \overline{\psi} = \mathbb{H}_d(f)\psi \in \mathbb{R}^n$$ [Equation 16]

Similarly, a single-input multi-output (SIMO) convolution using CNN filter kernel $\Psi = [\psi_1 \ldots, \psi_q] \in \mathbb{R}^{d \times q}$ may be represented by Equation 17 below.

$$Y = f \circledast \overline{\psi} = \mathbb{H}_d(f)\Psi \in \mathbb{R}^{n \times q}$$ [Equation 17]

Here, q denotes the number of output channels.

A multi-input multi-output (MIMO) convolution in CNN may be represented by Equation 18 below.

$$Y = F \circledast \Psi = \mathbb{H}_{d|p}(F) \begin{bmatrix} \Psi_1 \\ \vdots \\ \Psi_p \end{bmatrix}$$ [Equation 18]

Here, p and q refer to the number of input and output channels, respectively.

The j-th input channel filter may be represented as Equation 19 below.

$$\Psi_j = [\psi_1^j \ldots \psi_q^j] \in \mathbb{R}^{d \times q} \quad \text{[Equation 19]}$$

The extension to the multi-channel 2-D convolution operation for an image domain CNN may be straightforward, since similar matrix vector operations may also be used. That is, the extension to the multi-channel 2-D convolution operation for the image domain CNN may be changed in only the definition of the Hankel matrices, which is defined as block Hankel matrix, or the extended Hankel matrices.

One of the most intriguing properties of the Hankel matrix is that it often has a low-rank structure and its low-rankness is related to the sparsity in the Fourier domain. This property is extremely useful, as evidenced by their applications for many inverse problems and low-level computer vision problems.

Deep Convolutional Framelets

An embodiment of the inventive concept may briefly review the theory of deep convolutional framelets. Using the existing Hankel matrix approaches, an embodiment of the inventive concept may consider the following regression problem as Equation 20 below.

$$\min_{f \in \mathbb{R}^n} \|f^* - f\|^2 \quad \text{[Equation 20]}$$
$$\text{subject to } \text{RANK } \mathbb{H}_d(f) \leq r < d$$

Here, $f^* \in \mathbb{R}^d$ denotes the ground-truth signal.

The classical approach to address the problem of Equation 20 above is to use singular value shrinkage or matrix factorization. However, in deep convolutional framelets, the problem is addressed using learning-based signal representation.

More specifically, for any feasible solution f for Equation 20 above, its Hankel structured matrix $\mathbb{H}_d(f)$ has the singular value decomposition $\mathbb{H}_d(f) = U\Sigma V^T$, where $U = [u_1 \ldots u_r] \in \mathbb{R}^{n \times r}$ and $V = [v_1 \ldots v_r] \in \mathbb{R}^{d \times r}$ denote the left and right singular vector basis matrices, respectively. $\Sigma = (\sigma_{ij}) \in \mathbb{R}^{r \times r}$ is the diagonal matrix with singular values. An embodiment of the inventive concept may consider the matrix pairs $\Phi, \tilde{\Phi} \in \mathbb{R}^{n \times n}$ satisfying the frame condition represented in Equation 21 below.

$$\tilde{\Phi}\Phi^T = I \quad \text{[Equation 21]}$$

These bases are referred to as non-local bases since they interact with all the n-elements of $f \in \mathbb{R}^n$ by multiplying them to the left of $\mathbb{H}_d(f) \in \mathbb{R}^{n \times d}$. An embodiment of the inventive concept may need another matrix pair $\Psi, \tilde{\Psi} \in \mathbb{R}^{d \times r}$ satisfying the low dimensional subspace constraint represented in Equation 22 below.

$$\Psi\tilde{\Psi}^T = P_{R(V)} \quad \text{[Equation 22]}$$

These may be called local bases because they only interact with d-neighborhood of the signal $f \in \mathbb{R}^n$. Using Equations 21 and 22 above, an embodiment of the inventive concept may obtain the Hankel matrix reconstruction operator for the input signal f as Equation 23 below.

$$\mathbb{H}_d(f) = \tilde{\Phi}\Phi^T \mathbb{H}_d(f) \Psi\tilde{\Psi}^T \quad \text{[Equation 23]}$$

Here, $\mathbb{H}_d$ denotes the Hankel matrix reconstruction operator.

Factorizing $\Phi^T \mathbb{H}_d(f) \Psi$ from Equation 23 above results in the decomposition of f using a single layer encoder-decoder architecture as Equation 24 below.

$$f = (\tilde{\Phi}C) \circledast v(\tilde{\Psi}), \quad C = \Phi^T(f \circledast \bar{\Psi}) \quad \text{[Equation 24]}$$

Here, the encoder and decoder convolution filters are given by Equation 25 below.

$$\tilde{\Psi} := [\tilde{\psi}_1 \ldots \tilde{\psi}_q] \in \mathbb{R}^{d \times q}, \quad v(\tilde{\Psi}) := \frac{1}{d}\begin{bmatrix} \tilde{\psi}_1 \\ \vdots \\ \tilde{\psi}_q \end{bmatrix} \in \mathbb{R}^{dq} \quad \text{[Equation 25]}$$

Equation 24 above is the general form of the signals that are associated with a rank-r Hankel structured matrix, and an embodiment of the inventive concept is interested in specifying bases for optimal performance. In the deep convolutional framelets, $\Phi$ and $\tilde{\Phi}$ may correspond to the user-defined generalized pooling and unpooling to satisfy the frame condition of Equation 21 above. On the other hand, the filters $\Psi, \tilde{\Psi}$ need to be estimated from the data. To limit the search space for the filters, an embodiment of the inventive concept may consider $\mathcal{H}_0$, which consists of signals that have positive framelet coefficients. $\mathcal{H}_0$ that consists of the signals that have the positive framelet coefficients may be represented as Equation 16 below.

$$\mathcal{H}_0 = \{f \in \mathbb{R}^n | f = (\tilde{\Phi}C) \circledast v(\tilde{\Psi}), C = \Phi^T(f \circledast \bar{\Psi}) \geq 0\} \quad \text{[Equation 26]}$$

The main goal of the neural network training is to learn $(\Psi, \tilde{\Psi})$ from training data $\{(f_{(i)}, f^*_{(i)})\}_{i=1}^N$ assuming that $\{f^*_{(i)}\}$ is associated with rank-r Hankel matrices. More specifically, the regression problem in an embodiment of the inventive concept for the training data under rank-r Hankel matrix constraint in Equation 20 above may be given by Equation 27 below.

$$\min_{\{f_{(i)}\} \in \mathcal{H}_0} \sum_{i=1}^N \|f^*_{(i)} - f_{(i)}\|^2 \quad \text{[Equation 27]}$$

Equation 27 above may be represented as Equation 28 below.

$$\min_{\{\Psi, \tilde{\Psi}\}} \sum_{i=1}^N \|f^*_{(i)} - Q(f_{(i)}; \Psi, \tilde{\Psi})\|^2 \quad \text{[Equation 28]}$$

Here, Q may be represented as Equation 29 below.

$$Q(f_{(i)}; \Psi, \tilde{\Psi}) = (\tilde{\Phi}C[f_{(i)}]) \circledast v(\tilde{\Psi}) \quad \text{[Equation 29]}$$

Here, C may be represented as Equation 30 below.

$$C[f_{(i)}] = \rho(\Phi^T(f_{(i)} \circledast \bar{\Psi})) \quad \text{[Equation 30]}$$

Here, $\rho(\cdot)$ refers to the rectified linear unit (ReLU) to impose the positivity for the framelet coefficients.

After the network is fully trained, the inference for a given noisy input f is simply done by $Q(f; \Psi, \tilde{\Psi})$, which is equivalent to find a denoised solution that has the rank-r Hankel structured matrix.

In the sparse-view CT problems, it was consistently shown that the residual learning with a by-pass connection is better than direct image learning. To investigate this phenomenon systematically, assuming that the input image $f_{(i)}$ of sparse-view CT is contaminated with streaking artifacts, the input image $f_{(i)}$ of the sparse-view CT may be represented as Equation 31 below.

$$f_{(i)} = f^*_{(i)} + h_{(i)} \quad \text{[Equation 31]}$$

Here, $h_{(i)}$ denotes the streaking artifacts and $f^*_{(i)}$ refers to the artifact-free ground-truth image.

Then, instead of using the cost function, the residual network training may be formulated as Equation 32 below.

$$\min_{\{\Psi, \tilde{\Psi}\}} \sum_{i=1}^{N} \| h_{(i)} - Q(f^*_{(i)} + h_{(i)}; \Psi, \tilde{\Psi}) \|^2 \quad \text{[Equation 32]}$$

Here, the residual learning scheme is to find the filter $\Psi$ which approximately annihilates the true signal $f^*_{(i)}$ as Equation 33 below.

$$f^*_{(i)} \circledast \Psi \simeq 0 \quad \text{[Equation 33]}$$

The signal decomposition using deep convolutional framelets may be applied for the streaking artifact signal as Equation 34 below.

$$(\tilde{\Phi} C[f^*_{(i)} + h_{(i)}]) \circledast v(\tilde{\Psi}) \simeq (\tilde{\Phi} C[h_{(i)}]) \circledast v(\tilde{\Psi}) = h_{(i)} \quad \text{[Equation 34]}$$

Here, the first approximation may come from Equation 35 below thanks to the annihilating property of Equation 29 above.

$$C[f^*_{(i)} + h_{(i)}] = \Phi^T((f^*_{(i)} + h_{(i)}) \circledast \Psi) \simeq C[h_{(i)}] \quad \text{[Equation 35]}$$

Accordingly, the neural network is trained to learn the structure of the true image to annihilate the artifact signals, but still to retain the artifact signals.

The above-mentioned details may be extended to the multi-layer deep convolutional framelet. More specifically, for the L-layer decomposition, the space $\mathcal{H}_0$ in Equation 26 above may be recursively defined as Equation 36 below.

$$\mathcal{H}_0 = \quad \text{[Equation 36]}$$
$$\{ f \in \mathbb{R}^n \mid f = (\tilde{\Phi} C) \circledast v(\tilde{\Psi}), \ C = \Phi^T(f \circledast \Psi) \geq 0, \ C \in \mathcal{H}_1 \}$$

Here, $\mathcal{H}_l$, l=1, ..., L−1 may be defined as Equation 37 below.

$$\mathcal{H}_l = \{ Z \in \mathbb{R}^{n \times p(l)} \mid Z = (\tilde{\Phi} C^{(l)}) \circledast v(\tilde{\Psi}^{(l)}), C^{(l)} = \Phi^T(Z \circledast \Psi^{(l)}) \geq 0, C^{(l)} \in \mathcal{H}_{l+1} \}$$

$$\mathcal{H}_L = \mathbb{R}^{n \times p(L)} \quad \text{[Equation 37]}$$

In Equation 37 above, the l-th layer encoder and decoder filters may be defined by Equations 38 and 39 below.

$$\Psi^{(l)} := \begin{bmatrix} \psi_1^1 & \cdots & \psi_q^1 \\ \vdots & \ddots & \vdots \\ \psi_1^{p(l)} & \cdots & \psi_q^{p(l)} \end{bmatrix} \in \mathbb{R}^{d(l)p(l) \times q(l)} \quad \text{[Equation 38]}$$

$$v(\tilde{\Psi}^{(l)}) := \frac{1}{d} \begin{bmatrix} \tilde{\psi}_1^1 & \cdots & \tilde{\psi}_1^{p(l)} \\ \vdots & \ddots & \vdots \\ \tilde{\psi}_{q(l)}^1 & \cdots & \tilde{\psi}_{q(l)}^{p(l)} \end{bmatrix} \in \mathbb{R}^{d(l)q(l) \times p(l)} \quad \text{[Equation 39]}$$

Here, $d_{(l)}$, $p_{(l)}$, $q_{(l)}$ denote the filter length, and the number of input and output channels, respectively.

As described above, by recursively narrowing the search space of the convolution frames in each layer, an embodiment of the inventive concept may obtain the deep convolution framelet extension and the associated training scheme.

In short, the non-local bases $\Phi^T$ and $\tilde{\Phi}$ correspond to the generalized pooling and unpooling operations, while the local bases $\Psi$ and $\tilde{\Psi}$ work as learnable convolutional filters. Moreover, for the generalized pooling operation, the frame condition may be the most important prerequisite for enabling the recovery condition and controllable shrinkage behavior, which is the main criterion for constructing the U-Net variants.

FIG. 3 is an operational flowchart illustrating an image processing method according to an embodiment of the inventive concept.

Referring to FIG. 3, the image processing method according to an embodiment of the inventive concept may include receiving (S310) sparse-view CT data and reconstructing (S320) an image for the sparse-view CT data using a neural network of a learning model satisfying a predetermined frame condition.

Herein, operation S320 may be to reconstruct the image the sparse-view CT data using the neural network of the learning model which satisfies the frame condition and is learned by residual learning.

The neural network used in an embodiment of the inventive concept may include a neural network which generates a learning model which satisfies the frame condition through a mathematical analysis based on the convolutional framelets and is learned by the learning model and may include a multi-resolution neural network including pooling and unpooling layers.

Herein, the neural network may include a structured tight frame neural network by decomposing a structured dual frame neural network and the multi-resolution neural network into a low-frequency domain and a high-frequency domain using wavelets by expressing the mathematical expression of the multi-resolution neural network as the dual frame.

In addition, the neural network may include a by-pass connection from the pooling layer to the unpooling layer.

A description will be given of the method according to an embodiment of the inventive concept with reference to FIGS. 3 to 6.

Figure 1:
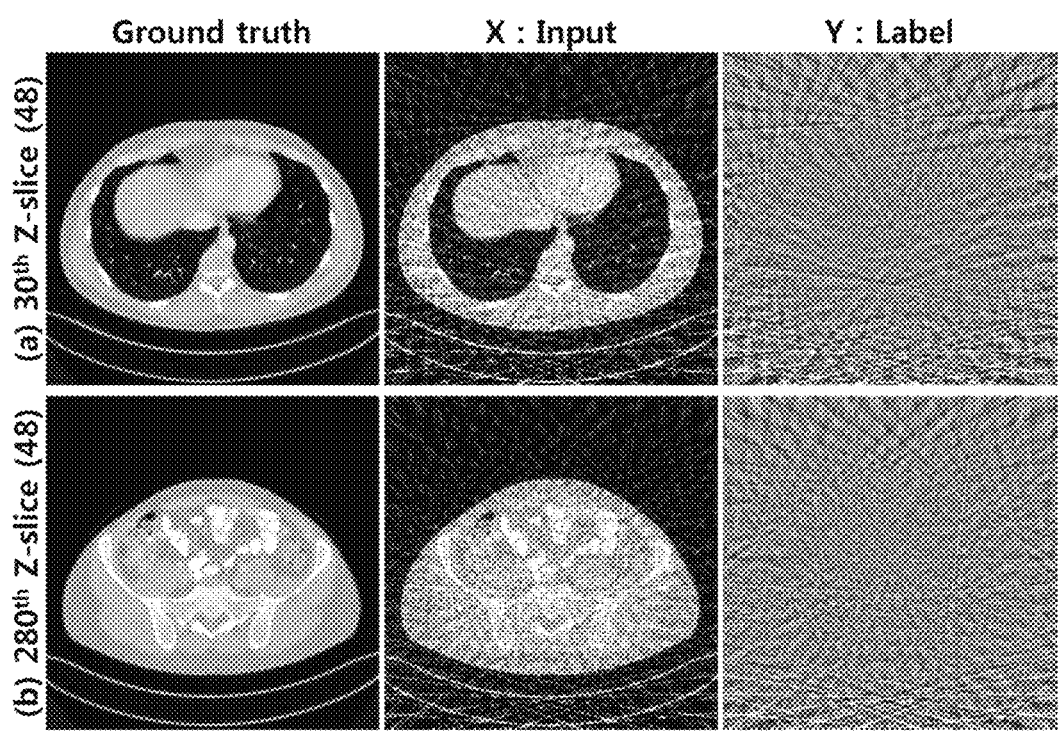

U-Net for Sparse-View CT and its Limitations (a) and (b) of FIG. 1 are drawings illustrating an example of CT streaking artifact patterns in the reconstruction images from 48 projection views. (a) and (b) of FIG. 1 show two reconstruction images and their artifact-only images when only 48 projection views are available.

As shown in (a) and (b) of FIG. 1, there is a significant streaking artifact that emanates from images over the entire image area. This suggests that the receptive field of the convolution filter should cover the entire area of the image to effectively suppress the streaking artifacts.

One of the most important characteristics of multi-resolution architecture like U-Net (O. Ronneberger, P. Fischer, and T. Brox, "U-Net: Convolutional networks for biomedical image segmentation," in International Conference on Medical Image Computing and Computer-Assisted Intervention. Springer, 2015, pp. 234-241.) is the exponentially large receptive field due to the pooling and unpooling layers.

(a) and (b) of FIG. 2 are drawings illustrating an example of comparing sizes of receptive fields according to a structure of a network or a neural network. (a) and (b) of FIG. 2 compare the size of the receptive field of a multi-resolution network U-Net ((b) of FIG. 2) and a single resolution CNN ((a) of FIG. 2) without pooling layers. As shown in (a) of FIG. 2, for the general neural network, the receptive field becomes larger and larger as it passes through the convolution layer Conv. However, because the rate of increase is not high, it should have the very deep neural network architecture to include the entire area. However, when the depth of the neural network becomes deeper and deeper, it may face the problem of gradient vanishing which is poor in learning the neural network or overfitting may occur due to a large number of parameters. On the other hand, as shown in (b) of FIG. 2, for U-Net, because the input image decreases in size as the receptive field passes through pooling and unpooling layers, the reception field for the input image may become relatively larger. Due to this, compared with the general neural network of the same depth, an embodiment of the inventive concept may have the larger receptive field. Thus, the neural network architecture that has a large receptive field on the neural network may be mainly used as the multi-resolution architecture, for example, the U-Net architecture, when performing the segmentation in the image. However, from the theoretical viewpoint, the limit clearly exists in the image reconstruction using the U-Net architecture. Furthermore, as may be observed in (a) and (b) of FIG. 2, with the same size convolutional filters, the receptive field is enlarged in the network with pooling layers. Thus, the multi-resolution architecture, such as U-Net, is good for the sparse view CT reconstruction to deal with the globally distributed streaking artifacts.

(a) of FIG. 4 shows a simplified U-Net architecture. As shown in (a) of FIG. 4, U-Net play a role in delivering the signal of the input unit to the output unit, by using the average pooling layer and the average unpooling layer as the non-local bases and through the by-pass connection layer expressed by a dotted line.

The U-Net is recursively applied to the low-resolution signal. Here, the input $f \in \mathbb{R}^n$ is first filtered with the local convolutional filter $\Psi$, which is then reduced to a half size approximate signal using a pooling operation $\Phi$. Mathematically, this step may be represented by Equation 40 below.

$$C = \Phi^T(f \circledast \Psi) = \Phi^T \mathbb{H}_d(f)\Psi \qquad \text{[Equation 40]}$$

Here, $f \circledast \Psi$ denotes the multi-channel convolution in CNN. For the case of average pooling, $\Phi^T$ denotes a pooling operator, and the pooling operator is given by Equation 41 below.

$$\Phi^T = \frac{1}{\sqrt{2}} \begin{bmatrix} 1 & 1 & 0 & 0 & \cdots & 0 & 0 \\ 0 & 0 & 1 & 1 & \cdots & 0 & 0 \\ \vdots & & & & \ddots & & \vdots \\ 0 & 0 & 0 & 0 & \cdots & 1 & 1 \end{bmatrix} \in \mathbb{R}^{\frac{n}{2} \times n} \qquad \text{[Equation 41]}$$

As shown in (a) of FIG. 4, the U-Net has the by-pass connection to compensate for the lost high frequency during pooling. Combining the two, the convolutional framelet coefficients may be represented by Equation 42 below.

$$C_{ext} = \Phi_{ext}^T(f \circledast \Psi) = \begin{bmatrix} B \\ S \end{bmatrix} \qquad \text{[Equation 42]}$$

Here, $\Phi_{ext}^T$ refers to the extended pooling, B refers to the bypass component, and S refers to the low pass subband. $\Phi_{ext}^T$ may be given by Equation 43 below, and B and S may be represented as Equation 44 below.

$$\Phi_{ext}^T := \begin{bmatrix} I \\ \Phi^T \end{bmatrix} \qquad \text{[Equation 43]}$$

$$B = f \circledast \Psi, \; S = \Phi^T(f \circledast \Psi) \qquad \text{[Equation 44]}$$

Thus, Equation 45 below may be derived using the above-mentioned equations.

$$\Phi_{ext}\Phi_{ext}^T = I + \Phi\Phi^T \qquad \text{[Equation 45]}$$

Here, $\Phi\Phi^T = P_{R(\Phi)}$ for the case of average pooling.

Thus, $\Phi_{ext}$ does not satisfy the frame condition, which results in artifacts.

In other words, because the signal reconstructed through the neural network of the general U-Net architecture does not express the original signal perfectly and leads to an overemphasis of the low frequency components, the blurred reconstruction signal may be generated.

Dual Frame U-Net

As described above, one simple fix for the aforementioned limitation is using the dual frame. Specifically, using Equation 10 above, the dual frame for $\Phi_{ext}$ in Equation 43 above may be obtained as Equation 46 below.

$$\tilde{\Phi}_{ext} = (\Phi_{ext}\Phi_{ext}^T)^{-1}\Phi_{ext} = (I + \Phi\Phi^T)^{-1}[I\Phi] \qquad \text{[Equation 46]}$$

Here, thanks to the matrix inversion lemma and the orthogonality $\Phi^T\Phi = I$ for the case of average pooling, an embodiment of the inventive concept may obtain Equation 47 below.

$$(I + \Phi\Phi^T)^{-1} = I - \Phi(I + \Phi^T\Phi)^{-1}\Phi^T = I - \tfrac{1}{2}\Phi\Phi^T \qquad \text{[Equation 47]}$$

Thus, the dual frame may be given by Equation 48 below.

$$\tilde{\Phi}_{ext} = (I - \Phi\Phi^T/2)[I\Phi] = [I - \Phi\Phi^T/2\Phi/2] \qquad \text{[Equation 48]}$$

For a given framelet coefficient $C_{ext}$ in Equation 42 above, the reconstruction using the dual frame may be given by Equation 49 below.

$$\hat{C}_{ext} := \tilde{\Phi}_{ext} C_{ext} = \left(I - \frac{\Phi\Phi^T}{2}\right)B + \frac{1}{2}\Phi S$$

$$= B + \frac{1}{2}\underbrace{\Phi}_{unpooling}\overbrace{(S - \Phi^T B)}^{residual} \qquad \text{[Equation 49]}$$

Constructing the neural network based on Equation 49 above may suggest a network structure for the dual frame U-Net. More specifically, unlike the U-Net, the residual signal at the low resolution may be upsampled through the unpooling layer. This may be easily implemented using an additional by-pass connection for the low-resolution signal as shown in (b) of FIG. 4. This simple fix allows the network to satisfy the frame condition. However, there exists noise amplification like $I + \Phi\Phi^T = I + P_{R(\Phi)}$.

Similar to the U-Net, the final step of dual frame U-Net is the concatenation and the multi-channel convolution, which is equivalent to applying the inverse Hankel operation, i.e., $\mathbb{H}_d^{\dagger}(\bullet)$, to the processed framelet coefficients multiplied with the local basis. Specifically, the concatenated signal may be given by Equation 50 above. The final convolution may be equivalently computed by Equation 50 below.

$$W = \left[ B \frac{1}{2} \Phi(S - \Phi^\top B) \right] \quad \text{[Equation 50]}$$

$$\begin{aligned}
\hat{f} &= \mathbb{H}_d^{\dagger}\left( W \begin{bmatrix} \Xi^\top \\ \Theta^\top \end{bmatrix} \right) \quad \text{[Equation 51]} \\
&= \mathbb{H}_d^{\dagger}(B\Xi^\top) + \frac{1}{2}\mathbb{H}_d^{\dagger}(\Phi S \Theta^\top) - \frac{1}{2}\mathbb{H}_d^{\dagger}(\Phi \Phi^\top B \Theta^\top) \\
&= \mathbb{H}_d^{\dagger}(\mathbb{H}_d(f)\Psi\Xi^\top) \\
&= \frac{1}{d}\sum_{i=1}^{q}(f \circledast \overline{\psi}_i \circledast \xi_i)
\end{aligned}$$

Here, the third equation in Equation 51 above comes from $S = \Phi^T(F \circledast \Psi) = \Phi^T B$. Therefore, by choosing the local filter basis such that $\Psi\Xi = I$, the right hand side of Equation 51 above becomes equal to f, satisfying the recovery condition.

Tight Frame U-Net

Another way to improve the performance of U-Net with minimum noise amplification is using tight filter-bank frames or wavelets. Specifically, the non-local basis $\Phi^T$ may be composed of filter bank as represented in Equation 52 below.

$$\Phi = [T_1 \ldots T_L] \quad \text{[Equation 52]}$$

Here, $T_k$ denotes the k-th subband operator.

An embodiment of the inventive concept assumes that the filter bank is tight like Equation 53 below, i.e., for some scalar c>0.

$$\Phi\Phi^\top = \sum_{k=1}^{L} T_k T_k^\top = cI \quad \text{[Equation 53]}$$

The convolutional framelet coefficients including a by-pass connection may be written by Equation 54 below.

$$C_{ext} := \Phi_{ext}^T(f \circledast \Psi) = [B^T S_1^T \ldots S_L^T]^T \quad \text{[Equation 54]}$$

Here, $\Phi_{ext} := [I \ T_1 \ldots T_L]^T$, $B = f \circledast \Psi$, $S_k = T_k^T C$.

An embodiment of the inventive concept may see that $\Phi_{ext}$ is also a tight frame by Equation 55 below.

$$\Phi_{ext}\Phi_{ext}^\top = I + \sum_{k=1}^{L} T_k T_k^\top = (c+1)I \quad \text{[Equation 55]}$$

There are several important tight filter bank frames. One of the simplest tight filter bank frames is that Haar wavelet transform with low-pass subband decomposition and high-pass subband decomposition, where $T_1$ is the low-pass subband, which is equivalent to the average pooling in Equation 37 above and $T_2$ is the high-pass subband filter. The high-pass filtering $T_2$ may be given by Equation 56 below.

$$T_2 = \frac{1}{\sqrt{2}} \begin{bmatrix} 1 & -1 & 0 & 0 & \ldots & 0 & 0 \\ 0 & 0 & 1 & -1 & \ldots & 0 & 0 \\ \vdots & & & & \ddots & & \vdots \\ 0 & 0 & 0 & 0 & \ldots & 1 & -1 \end{bmatrix}^\top \quad \text{[Equation 56]}$$

An embodiment of the inventive concept may see that $T_1T_1^T + T_2T_2^T = I$; so the Haar wavelet frame is tight. In the corresponding tight frame U-Net structure, as illustrated in (c) of FIG. 4, in contrast to the U-Net structure in (a) of FIG. 4, there is an additional high-pass branch. As shown in (c) of FIG. 4, similar to the U-Net in (a) of FIG. 4, in the tight frame U-Net, each subband signal is by-passed to the individual concatenation layers. The convolutional layer after the concatenation layers may provide weighted sum of which weights are learned from data. This simple fix makes the frame tight.

In other words, the neural network of the tight frame U-Net structure shown in (c) of FIG. 4 may be expressed as the neural network which has the tight filter-bank or the wavelet as the non-local basis to satisfy the convolutional frame. Herein, the non-local basis of the tight frame U-Net may satisfy the tight frame.

The nonlinear operation may restrict the sparsity of the signal for various input signals f or may restrict the positivity of the signal. This may enable the neural network to learn various input signals or the transform signal. This may enable local and non-local basis vectors of the linear transform operation to find various solutions. Moreover, the nonlinear operation may construct the nonlinear operation in the form of satisfying the reconstruction condition.

The residual learning is applicable to the neural network to enhance the learning effect. The residual learning may make the local basis of the linear transform lower rank, so the unnecessary load of the neural network may be greatly reduced. Such an internal by-pass connection or an external by-pass connection may overcome the difficulty of the deep network training to improve the performance of removing the local noise and the non-local noise.

FIGS. 5A to 5C are drawings illustrating a standard U-Net architecture (5A), a dual frame U-Net architecture (5B), and a tight frame U-Net architecture (5C).

As shown in FIGS. 5A to 5C, each network may include a convolution layer for performing the linear transform operation, a batch normalization layer for performing the normalization operation, a rectified linear unit (ReLU) layer for performing the nonlinear function operation, and a path connection with concatenation. Specifically, each stage may include four sequential layers composed of convolution with 3×3 kernels, batch normalization, and ReLU layers. The last stage may include two sequential layers and the last layer. The last layer may include only the convolution layer with 1×1 kernel. The number of channels for each convolution layer is illustrated in FIGS. 5A to 5C. The number of channels may be doubled after each pooling layers. The differences between the U-Net and the dual frame U-Net or the tight frame U-Net are from the pooling and unpooling layers.

As shown in FIG. 5A, because the pooling and unpooling layers included in the U-Net structure do not satisfy the frame condition, the standard U-Net may show the limitation of the reconstruction level from the signal point of view. An embodiment of the inventive concept may mathematically prove the limit of the existing U-Net structure and may formulate the theory capable of overcoming the limit based on it, thus providing the dual frame U-Net and the tight frame U-Net which are the neural network architecture satisfying the frame condition.

As shown in FIG. 5B, the dual frame U-Net may express the mathematical expression of the U-Net as the dual frame to be the structured neural network architecture and may be the neural network architecture proposed to have the similar amount of computation to the U-Net structure and satisfy the frame condition by adding the residual path concurrently with maintaining the general U-Net structure.

As shown in FIG. 5C, the tight frame U-Net may decompose the low-frequency domain and the high-frequency domain using the wavelet. The low-frequency domain may be decomposed stage by stage to be the same as the operation performed in the general U-Net structure, while the high-frequency domain may be reconstructed without losing the high-frequency signal, by designing the path to pass to the opposite layer.

(a) to (c) of FIG. 6 are drawings illustrating an example of reconstruction results by general, dual frame, and tight frame U-Nets at various sparse view reconstruction. The left box in each image region illustrates the enlarged images, and the right box illustrates the difference images. The number written to the images is the normalized mean square error (NMSE) value.

As shown in the enlarged images and the difference images shown in (a) to (c) of FIG. 6, the U-Net produces blurred edge images in many areas, while the dual frame and tight frame U-Nets may enhance the high frequency characteristics of the images. In other words, the dual frame U-Net and the tight frame U-Net according to an embodiment of the inventive concept may reduce the phenomenon in which the images are crushed, which is the limit of the general U-Net, and may reconstruct all sparse-view images using the single neural network without the correction of additional parameters by simultaneously learning various sparse-view images.

FIG. 7 is a block diagram illustrating a configuration of an image processing device according to an embodiment of the inventive concept and illustrates a configuration of a device which performs the methods in FIGS. 3 to 6.

Referring to FIG. 7, an image processing device 700 according to an embodiment of the inventive concept may include a reception unit 710 and a reconstruction unit 720.

The reception unit 710 may receive sparse-view CT data.

The reconstruction unit 720 may reconstruct an image for the sparse-view CT data using a neural network for a learning model which satisfies a predetermined frame condition and is based on the convolutional framelets.

Herein, the reconstruction unit 720 may reconstruct the image for the sparse-view CT data using the neural network of the learning model which satisfies the frame condition and is learned by the residual learning.

The neural network used in the device according to an embodiment of the inventive concept may include a neural network which generates a learning model satisfying the frame condition through a mathematical analysis based on the convolutional framelets and is learned by the learning model and may include a multi-resolution neural network including pooling and unpooling layers.

Herein, the multi-resolution neural network may include a structured tight frame neural network by decomposing a structured dual frame neural network and the multi-resolution neural network into a low-frequency domain and a high-frequency domain using wavelets by expressing the mathematical expression of the multi-resolution neural network as the dual frame.

In addition, the neural network may include a by-pass connection from the pooling layer to the unpooling layer.

It is apparent to those skilled in the art that, although the description is omitted in the image processing device 700 of FIG. 7, the respective components configuring FIG. 7 may include all details described in FIGS. 1 to 6.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments of the inventive concept, the image processing device may reconstruct a sparse-view CT image as a high-quality image using the neural network for the learning model satisfying the predetermined frame condition.

According to embodiments of the inventive concept, the image processing device may reconstruct a high-quality image while having the similar amount of calculation to the existing neural network architecture by mathematically proving the limit of the existing multi-resolution neural network, for example, the U-Net structure, formulating the theory capable of overcoming the limit based on it, providing the neural network satisfying the frame condition, and reconstructing the sparse-view CT image by means of the neural network.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image processing method, comprising:
   receiving a sparse-view computed tomography (CT) data; and
   reconstructing an image for the sparse-view CT data using a neural network of a learning model satisfying a predetermined frame condition,
   wherein the neural network comprises:
      a multi-resolution neural network including pooling and unpooling layers; and
      a structured tight frame neural network by decomposing a structured dual frame neural network and the multi-resolution neural network into a low-frequency domain and a high-frequency domain using wavelets by expressing a mathematical expression of the multi-resolution neural network as a dual frame $\tilde{\Phi}$,
   wherein the predetermined frame condition is represented by the equation
   $$\tilde{\Phi}\Phi^T = I.$$

2. The image processing method of claim 1, wherein the reconstructing of the image comprises:
   reconstructing the image for the sparse-view CT data using the neural network of the learning model which satisfies the frame condition and is learned by residual learning.

3. The image processing method of claim 1, wherein the neural network comprises:
   a neural network which generates the learning model satisfying the frame condition through a mathematical analysis based on convolutional framelets and is learned by the learning model.

4. The image processing method of claim 1, wherein the neural network comprises:
   a by-pass connection from the pooling layer to the unpooling layer.

5. An image processing method, comprising:
   receiving a sparse-view CT data; and
   reconstructing an image for the sparse-view CT data using a neural network for a learning model which satisfies a predetermined frame condition and is based on convolutional framelets,
   wherein the neural network comprises:
      a multi-resolution neural network including pooling and unpooling layers; and
      a structured tight frame neural network by decomposing a structured dual frame neural network and the multi-resolution neural network into a low-frequency domain and a high-frequency domain using wavelets by expressing a mathematical expression of the multi-resolution neural network as a dual frame $\tilde{\Phi}$,
   wherein the predetermined frame condition is represented by the equation
   $$\tilde{\Phi}\Phi^T = I.$$

6. An image processing device, comprising:
   a reception unit configured to receive a sparse-view CT data; and
   a reconstruction unit configured to reconstruct an image for the sparse-view CT data using a neural network of a learning model satisfying a predetermined frame condition,
   wherein the neural network comprises:
      a multi-resolution neural network including pooling and unpooling layers; and
      a structured tight frame neural network by decomposing a structured dual frame neural network and the multi-resolution neural network into a low-frequency domain and a high-frequency domain using wavelets by expressing a mathematical expression of the multi-resolution neural network as a dual frame $\tilde{\Phi}$,
   wherein the predetermined frame condition is represented by the equation
   $$\tilde{\Phi}\Phi^T = I.$$

7. The image processing device of claim 6, wherein the reconstruction unit is configured to:
   reconstruct the image for the sparse-view CT data using the neural network of the learning model which satisfies the frame condition and is learned by residual learning.

8. The image processing device of claim 6, wherein the neural network comprises:
   a neural network which generates the learning model satisfying the frame condition through a mathematical analysis based on convolutional framelets and is learned by the learning model.

9. The image processing device of claim 6, wherein the neural network comprises:
   a by-pass connection from the pooling layer to the unpooling layer.

* * * * *